(12) United States Patent
Buxton (10) Patent No.: US 8,689,843 B2
(45) Date of Patent: Apr. 8, 2014

(54) SNOW PERFORMANCE PEAKS

(75) Inventor: Todd A. Buxton, Norton, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 55 days.

(21) Appl. No.: 13/325,075

(22) Filed: Dec. 14, 2011

(65) Prior Publication Data

US 2013/0153104 A1   Jun. 20, 2013

(51) Int. Cl.
*B60C 11/11* (2006.01)
*B60C 11/13* (2006.01)

(52) U.S. Cl.
USPC ............ 152/209.19; 152/209.15; 152/209.18; 152/902

(58) Field of Classification Search
USPC .................. 152/209.18–209.19, DIG. 1, 902, 152/209.15
IPC ................................ B60C 11/11,11/13, 11/113
See application file for complete search history.

(56) References Cited

U.S. PATENT DOCUMENTS

| | | | | |
|---|---|---|---|---|
| 5,024,260 | A * | 6/1991 | Ochiai ..................... | 152/209.19 |
| 5,131,444 | A | 7/1992 | Kukimoto et al. | |
| 5,180,453 | A | 1/1993 | Fukasawa et al. | |
| 5,203,933 | A * | 4/1993 | Nagahisa ................. | 152/209.15 |
| 5,345,988 | A | 9/1994 | Kabe et al. | |
| 5,385,189 | A | 1/1995 | Aoki et al. | |
| 5,388,625 | A | 2/1995 | White | |
| 5,445,201 | A | 8/1995 | Kukimoto et al. | |
| 5,679,186 | A * | 10/1997 | Tagashira et al. ........ | 152/209.23 |
| 5,814,169 | A | 9/1998 | Yamaguchi et al. | |
| 5,833,780 | A | 11/1998 | Kishi et al. | |
| 6,006,804 | A | 12/1999 | Yokota | |
| 6,112,787 | A | 9/2000 | Fukumoto et al. | |
| 6,530,404 | B1 | 3/2003 | Rooney | |
| 6,554,034 | B1 | 4/2003 | Minami | |
| 6,591,880 | B1 | 7/2003 | Matsumoto et al. | |
| 6,631,746 | B2 | 10/2003 | Neumann | |

(Continued)

FOREIGN PATENT DOCUMENTS

| | | | |
|---|---|---|---|
| JP | S64-018706 | 1/1989 | |
| JP | 01226406 A * | 9/1989 | .............. B60C 11/11 |

(Continued)

OTHER PUBLICATIONS

Machine Translation: JP2000-025417, Nakamura; No date.*

(Continued)

*Primary Examiner* — Richard Crispino
*Assistant Examiner* — Kendra Shin (57) ABSTRACT

A tire is disclosed having a tread extending from a first tread edge to a second tread edge and having a plurality of blocks defining a plurality of lateral grooves. The lateral grooves have a groove bottom defining a radial groove depth. A first biting side extends outwardly from the groove bottom to a first biting edge, and a first non-biting side extending outwardly from the groove bottom to a first non-biting edge. At least one peak is disposed in at least one of the lateral grooves. The peak extends outwardly from the groove bottom and terminates radially at an outer end and axially at a distance from the equatorial plane less than or equal to one half of the tread width. The peak has a height between 25 percent and 75 percent of the depth of its lateral groove. Multiple peaks may be disposed within a groove.

20 Claims, 6 Drawing Sheets

(56) References Cited

U.S. PATENT DOCUMENTS

| | | |
|---|---|---|
| 6,695,024 B2 | 2/2004 | Neugebauer et al. |
| 6,761,197 B2 | 7/2004 | Carra et al. |
| 6,796,349 B2 | 9/2004 | Tozawa et al. |
| 7,048,022 B2 | 5/2006 | Rooney et al. |
| 7,269,997 B2 | 9/2007 | Dale et al. |
| 7,273,081 B2 | 9/2007 | Miyake |
| 7,350,551 B2 | 4/2008 | Nakamura |
| 2002/0029834 A1 | 3/2002 | IIzuka et al. |
| 2004/0060628 A1 | 4/2004 | Grimm |
| 2005/0103416 A1 | 5/2005 | Rooney et al. |
| 2007/0251622 A1 | 11/2007 | Tomita |
| 2008/0000565 A1 | 1/2008 | Tomita |
| 2008/0073012 A1* | 3/2008 | Miyazaki ................ 152/209.19 |
| 2008/0078487 A1* | 4/2008 | Ohara ..................... 152/209.19 |
| 2008/0121326 A1 | 5/2008 | Ohara |
| 2009/0194213 A1 | 8/2009 | Suzuki |

FOREIGN PATENT DOCUMENTS

| | | | | |
|---|---|---|---|---|
| JP | H02088312 | | 3/1990 | |
| JP | H06-048119 | | 2/1994 | |
| JP | H10006716 | | 1/1998 | |
| JP | H11189012 | | 7/1999 | |
| JP | 2000025417 A * | | 1/2000 | ............. B60C 11/11 |
| JP | 2000238508 | | 9/2000 | |
| JP | 2001055015 A * | | 2/2001 | ............. B60C 11/11 |
| JP | 2001063316 | | 3/2001 | |
| JP | H13-163015 | | 6/2001 | |
| JP | 2002029218 | | 1/2002 | |
| JP | 2002103918 | | 4/2002 | |
| JP | 2004299592 | | 10/2004 | |
| JP | 2008114824 | | 5/2008 | |
| JP | 2009107385 | | 5/2009 | |
| KR | 20-1998-0061889 U | | 11/1998 | |
| WO | 2005005861 | | 12/2004 | |

OTHER PUBLICATIONS

Summary: JP01-226406; Sakai; No date.*
Machine Translation: JP2001-055015; Gerresheim et al.; No date.*
Han Joong Sub, International Search Report and Written Opinion, Jan. 29, 2013, pp. 1-10, Korean Intellectual Property Office, Daejeon Metropolitan City, ROK.
Kawakami Shinji et al.; S64-018706; Snow Tire; Patent Abstract; Jan. 23, 1989.

* cited by examiner

SNOW PERFORMANCE PEAKS

FIELD OF INVENTION

The present disclosure is directed to tires. More particularly, the present disclosure is directed to tires having tread features that improve tire performance in wintery and snowy environments.

BACKGROUND

Tire performance is generally diminished in wintery and snowy environments relative to dry weather. Features that improve such performance, whether the performance relates to stopping distance, cornering ability, the coefficient of friction between the tire and road, or other metrics, are therefore desirable. Further, in addition to performance improvement of a new tire in wintery and snowy environments, improvements in the ability of tires to perform in wintery or snowy environments during the entire wear life of the tire is also desirable.

SUMMARY

A tire is disclosed having a tread extending from a first tread edge to a second tread edge and having a plurality of blocks defining a plurality of lateral grooves. The lateral grooves have a groove bottom defining a radial groove depth. A first biting side extends outwardly from the groove bottom to a first biting edge, and a first non-biting side extending outwardly from the groove bottom to a first non-biting edge. At least one peak is disposed in at least one of the lateral grooves. The peak extends outwardly from the groove bottom and terminates radially at an outer end and axially at a distance from the equatorial plane less than or equal to one half of the tread width. The peak has a height between 25 percent and 75 percent of the depth of its lateral groove. Multiple peaks may be disposed within a groove.

BRIEF DESCRIPTION OF THE DRAWINGS

In the accompanying drawings, structures are illustrated that, together with the detailed description provided below, describe exemplary embodiments of a tire tread having performance enhancing peaks. One of ordinary skill in the art will appreciate that a single component may be designed as multiple components or that multiple components may be designed as a single component.

Further, in the accompanying drawings and description that follow, like parts are indicated throughout the drawings and written description with the same reference numerals, respectively. The figures are not drawn to scale and the proportions of certain parts have been exaggerated for convenience of illustration.

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"Axial" or "axially" refer to a direction that is parallel to the axis of rotation of a tire.

"Block" refers to a discrete tread element defined by a plurality of laterally and circumferentially extending grooves.

"Circumferential" and "circumferentially" refer to lines or directions extending along the perimeter of the surface of the tread parallel to the equatorial plane perpendicular to the axial direction of the tire.

"Equatorial plane" refers to the plane that is perpendicular to the tire's axis of rotation and passes through the center of the tire's tread, equidistant from the tread edges.

"Groove" refers to an elongated void area in the tread of the tire that extends generally circumferentially, generally laterally, or at an angle relative to the circumferential and/or lateral directions, in a straight, angled, curved or zig-zag manner.

"Lateral" or "laterally" refer to a direction along the tread from one sidewall of the tire to the other sidewall.

"Radial" or "radially" refer to a direction perpendicular to the axis of rotation of the tire.

"Sidewall" refers to that portion of the tire between the tread and the bead.

"Sipe," as used herein, refers to a thin slit formed in the surface of the tread that may extend laterally, circumferentially, or at an acute angle relative to the circumferential direction of the tire. A sipe can have a depth that is up to 100% of the maximum depth of a groove or slot formed in the tire.

"Tread" refers to that portion of the tire that comes into contact with the road under normal load.

The terms "inward" and "inwardly" refer to a general direction toward the axis of rotation of a tire, whereas "outward" and "outwardly" refer to a general direction away from the axis of rotation of a tire. Thus, when relative directional terms such as "inner" and "outer" are used in connection with an element, the "inner" element is spaced closer to the axis of rotation of a tire than the "outer" element.

Figure 1:
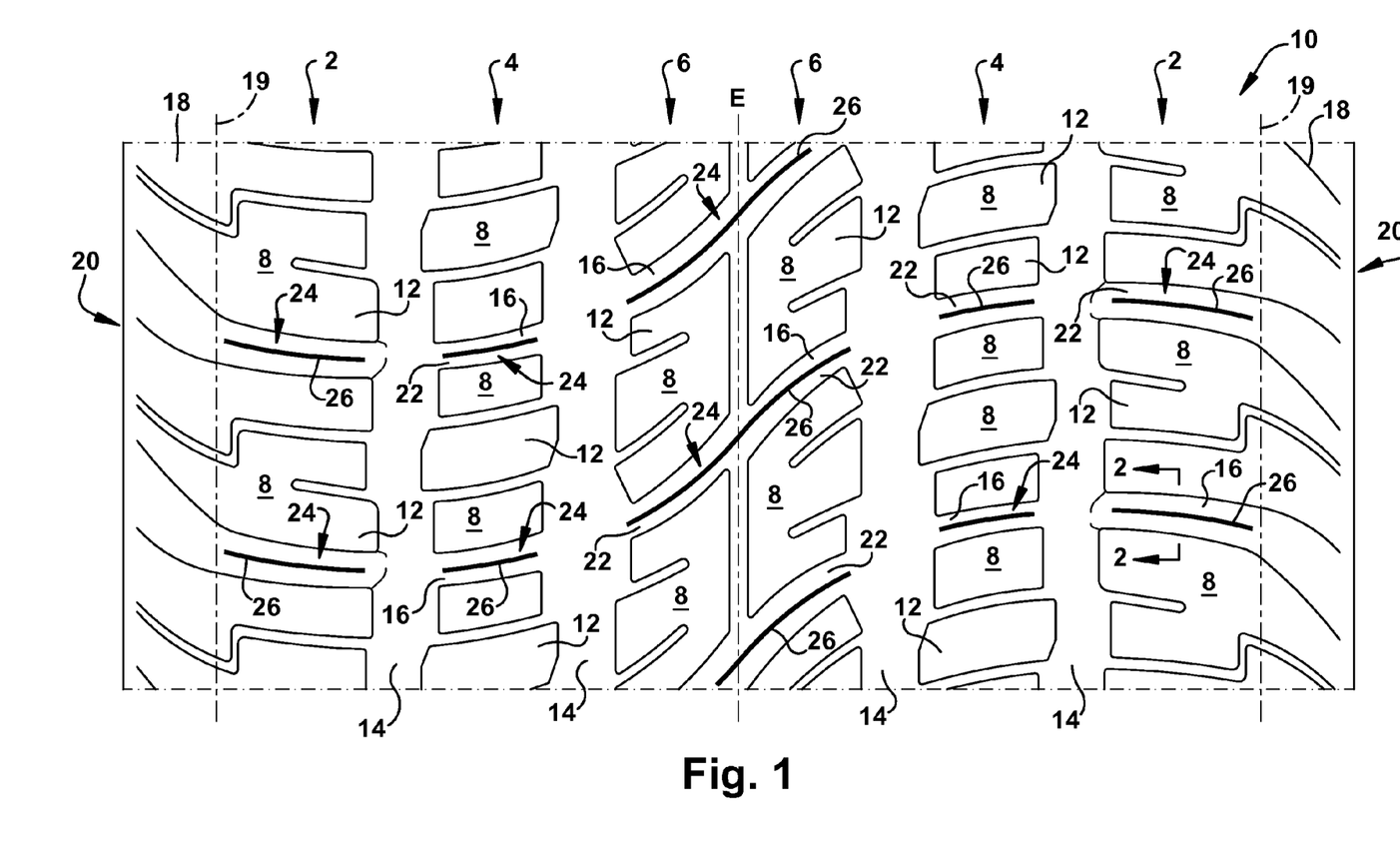
FIG. 1 illustrates a section of a tire tread according to one exemplary embodiment featuring performance peaks within lateral grooves.

FIG. 1 illustrates a section of a tire tread according to one exemplary embodiment of the present disclosure. Tire tread 10 has multiple tread blocks 12 that form circumferential grooves 14 that are generally aligned with equatorial plane E, and lateral grooves 16 that extend in a lateral direction across tread 10. Circumferential grooves 14 separate blocks 12 into lateral ribs 2, middle ribs 4 and inner ribs 6. The radially outermost surface of blocks 12 is the road contacting surface 8, which is the portion of tire tread 10 that makes contact with the road surface during normal operation. Tire tread 10 sits between tread edges 19, where tread 10 meets shoulders 18, which in turn transition to sidewalls 20.

Within lateral grooves 16 are laterally running peaks 22. Peaks 22 follow the contour of the lateral grooves 16. In the illustrated embodiment, peaks 22 have a radially outer end 24, shaped as a tapered edge 26. Peaks 22 may have radially outer end 24 having a variety of shapes. Lateral grooves 16 may have one peak 22, or may have multiple peaks 22. For example, one or more lateral grooves 16 may have two or three circumferentially adjacent peaks 22. In a new tire according to the present disclosure, peaks 22 are recessed inwardly relative to the road contacting surface 8. Peaks 22 may be blended into the bottom of circumferential grooves 14 at the intersection of circumferential 14 and lateral grooves 16. Peaks 22 may also take different shapes at the intersection of circumferential 14 and lateral grooves 16, such as terminating at a wall extending radially from circumferential grooves 14. Peaks 22 may also traverse circumferential grooves 14. Peaks 22 are shown in each lateral groove 16 in the illustrated embodiment. However, peaks 22 may be distributed among less than all of lateral grooves 16 of a tire tread 10. For example, peaks 22 may be distributed in a regular pattern, such as when peaks 22 are found in alternate lateral grooves 16, or every third lateral groove 16, for example. Such distributions may also be in irregular patterns such as by separating lateral grooves 16 having peaks 22 by different numbers of lateral grooves 16 without peaks 22. Other possible embodiments include distributing peaks 22 in different patterns in different ribs. For example, one of the lateral 2, middle 4 or inner ribs 6 may include peaks 22 in each lateral groove 16, while one or both of the other ribs may have peaks 22 in alternating or every third lateral groove 16. In the preferred embodiment, peaks 22 are located only on tire tread 10, and therefore terminate at a radial distance from the equatorial plane less than or equal to one half a tread width. In such an embodiment, peaks 22 do not extend across tread edges 19 into shoulders 18.

Figure 2:
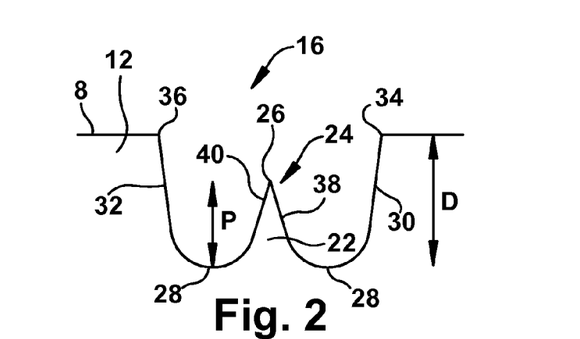
FIG. 2 illustrates an enhanced sectional view of a performance peak of FIG. 1 along the line 2-2, the peak having a height of 65 percent of the depth of its groove.

FIG. 2 illustrates a sectional view of tire tread 10 shown in FIG. 1 along the line 2-2. Lateral groove 16 has a groove bottom 28 from which peak 22 extends outwardly. Lateral groove 16 has a biting side 30 and non-biting side 32 that extend outwardly from groove bottom 28 to a biting edge 34 and non-biting edge 36, respectively. Biting edge 34 and non-biting edge 36 border road contacting surface 8 of their respective blocks 12. Biting edge 34 and biting side 30 are found on the side of road contacting surface 8 that makes contact with the road last, while non-biting edge 36 and non-biting side 32 are on the side of the of road contacting surface 8 that makes contact with the road first.

Figure 3:
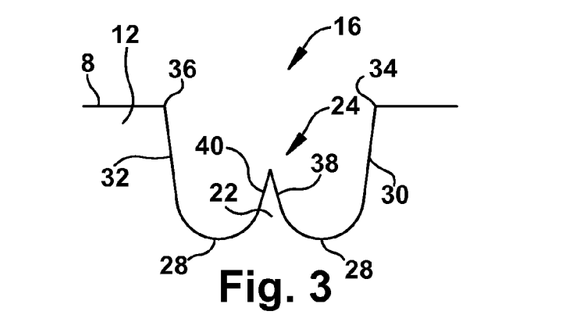
FIG. 3 illustrates an alternative peak having a height of 50 percent the depth of its groove.

In the illustrated embodiment, groove depth D corresponds to the distance between road contacting surface 8 and groove bottom 28 in the radial direction. Peak height P corresponds to the radial distance from groove bottom 28 to the radially outer end 24 of peak 22. In the illustrated embodiment, peak 22 terminates in a sharp tapered edge 26. Peak height P for peak 22 shown in FIG. 2 is 65 percent of groove depth D. Peak height P may range from 75 percent of D to 25 percent of D. For example, peak 22 shown in FIG. 3 has a similar shape to peak 22 shown in FIG. 2, but has a height P about 50 percent of groove depth D.

Figure 16:
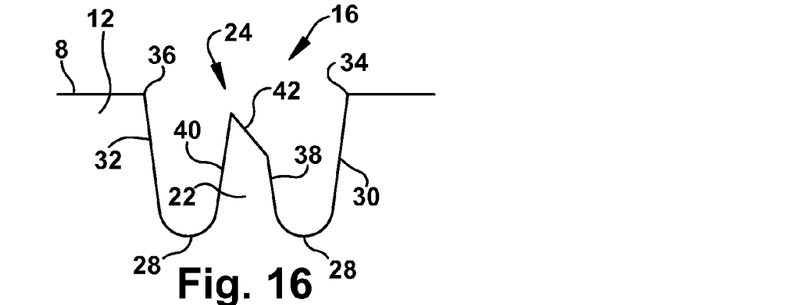
FIG. 16 illustrates an alternative peak having a tapered edge at the radially outer end.

Peak 22 shown in FIG. 2 has a pointed shape formed from a first peak wall 38 and second peak wall 40 that are generally planar and angled with respect to the radial direction such that they meet at tapered edge 26. Other embodiments of peak 22 having a tapered edge 26 may also be implemented according to the present disclosure. For example, with reference to FIG. 16, peak 22 has first peak wall 38 and second peak wall 40 that are generally planar and angled with respect to the radial direction. In the illustrated embodiment, first peak wall 38 and second peak wall 40 extend from groove bottom 28 at different angles. Second peak wall 40 extends further from groove bottom 28 than first peak wall 38. As shown in FIG. 16, a third peak wall 42, also planar and angled with respect to the radial direction, extends from the radially outward end of first peak wall 38 and forms a tapered edge 26 with second peak wall 40. In an alternative embodiment, first 38 and second peak walls 40 may be aligned with the radial direction, while third peak wall 42 extends at an angle with respect to the radial direction and forms a tapered edge 26 with second peak wall 40. In yet another embodiment, each of the angles of first peak wall 38, second peak wall 40 and third peak wall 42 extend at different angles with respect to the radial direction.

Figure 4:
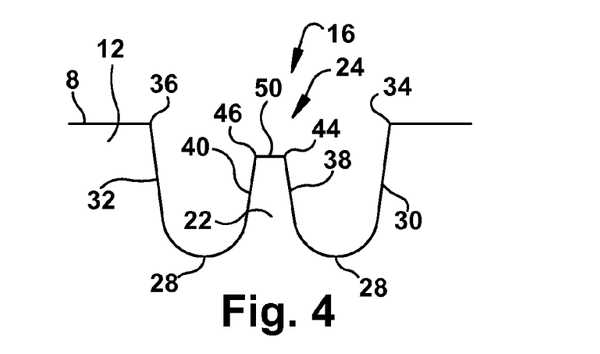
FIGS. 4 and 5 illustrate alternative embodiments of peaks, each having a flat outer end.
Figure 5:
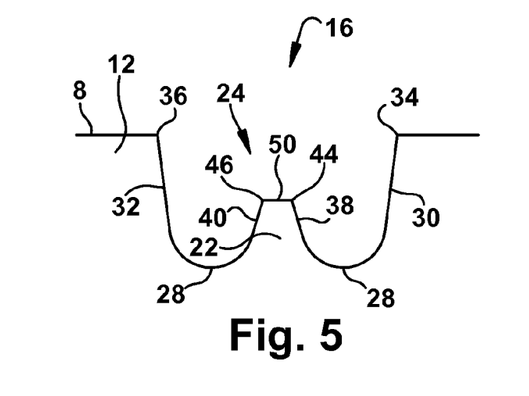
Figure 13:
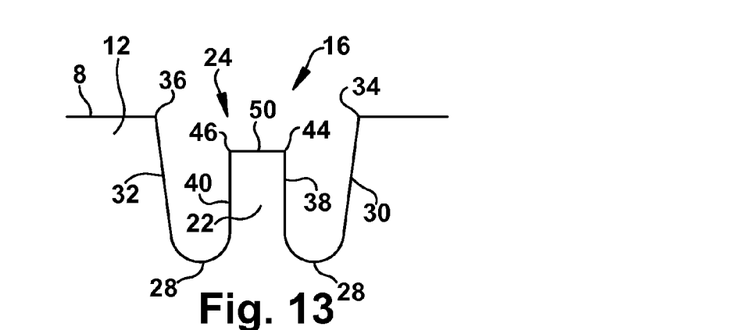
FIG. 13 illustrates an alternative peak having radially aligned sides and a flat outer end.

FIGS. 4 and 5 illustrate similar alternative embodiments of peak 22. In FIG. 4, the radially outer end 24 of peak 22 comprises a substantially flat surface 50 perpendicular to the radial direction. Flat surface 50 is bordered by a second biting edge 44 and a second non-biting edge 46. Peak 22 illustrated in FIG. 4 has a height of 75 percent of groove depth D, while peak 22 illustrated FIG. 5 has a height of 50 percent of groove depth D. In the embodiments illustrated in FIGS. 4 and 5, first 38 and second peak wall 40 are generally planar and angled with respect to the radial direction. In an alternative embodiment shown in FIG. 13, first 38 and second peak wall 40 are aligned with the radial direction. Like the embodiments shown in FIGS. 4 and 5, the embodiment shown in FIG. 13 has a substantially flat surface 50 perpendicular to the radial direction and bordered by a second biting edge 44 and a second non-biting edge 46.

Figure 6:
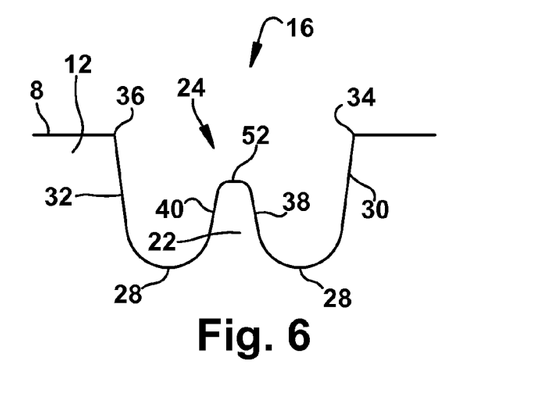
FIG. 6 illustrates an alternative embodiment of a peak having a rounded radially outer end.
Figure 15:
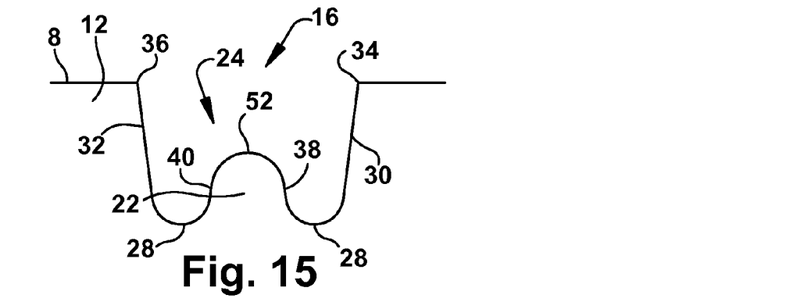
FIG. 15 illustrates an alternative embodiment of a peak having a rounded radially outer end.

In yet another alternative embodiment shown in FIG. 6, radially outer end 24 may comprise a rounded edge 52. In the illustrated embodiment, first 38 and second peak wall 40 are generally planar and angled with respect to the radial direction. In other embodiments, first 38 and second peak wall 40 may be aligned with the radial direction. As discussed further below, it should be noted that alternative embodiments according to the present disclosure have varied peak 22 heights and widths. For example, peak 22 shown in FIG. 15 is wider and shorter than that shown in FIG. 6, while still having a rounded edge 52.

Figure 7:
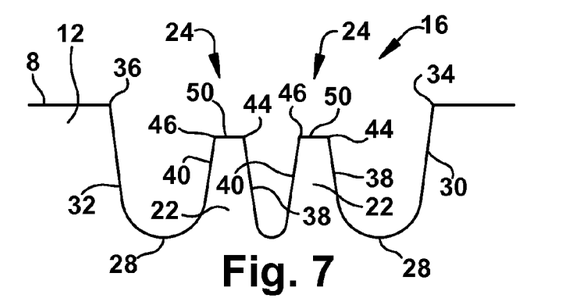
FIGS. 7-10 illustrate sectional views of grooves, each featuring more than one performance peak.
Figure 8:
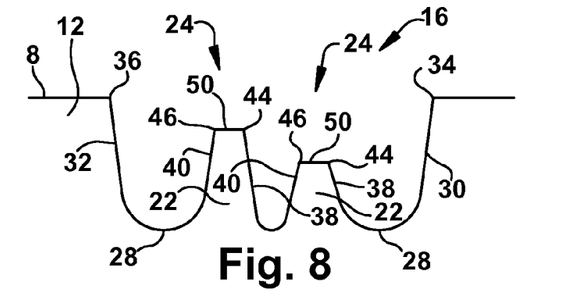
Figure 9:
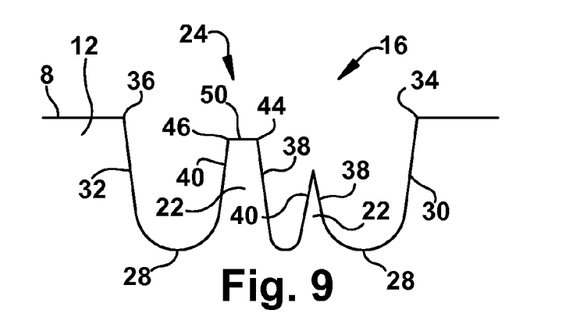
Figure 10:
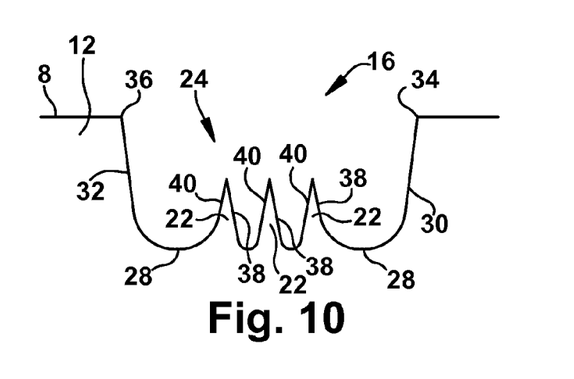

As shown in FIGS. 7 through 10, lateral grooves 16 may feature multiple peaks 22. In the illustrated embodiments, peaks 22 are adjacent to one another in the circumferential direction. As shown in FIG. 7, a lateral groove 16 may have two peaks 22 with a common shape. The twin peaks in FIG. 7 resemble those shown in FIGS. 4 and 5, but each peak in FIG. 7 has a peak height P of 75 percent of groove depth D. In an alternative embodiment shown in FIG. 8, lateral grooves 16 have two peaks 22 with similar shape but different peak heights P. Peak 22 adjacent biting side 30 has a peak height P of 50 percent of groove depth D, while peak 22 adjacent non-biting side 32 has a peak height P of 75 percent of groove depth D. In yet another alternative embodiment shown in FIG. 9, both the shape of peaks 22 and their peak heights P relative to groove depth D are different. In FIG. 9, peak 22 adjacent biting side 30 has a peak height P of 50 percent groove depth D and has a sharp tapered edge 26 at radially outer end 24 like that shown in FIGS. 2 and 3, while peak 22 adjacent non-biting side 32 has a peak height P of 75 percent groove depth D and a shape similar to that shown in FIGS. 4 and 5. FIG. 10 illustrates another embodiment having multiple peaks. As seen in FIG. 10, lateral groove 16 has three peaks 22 each with a shape similar to peaks 22 shown in FIGS. 2 and 3.

Figure 11:
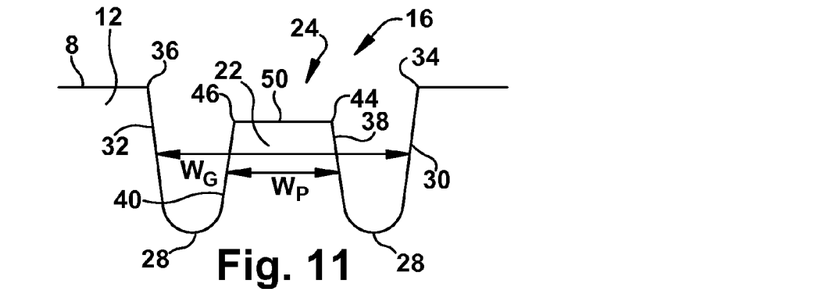
FIGS. 11 and 12 illustrate sectional views of grooves featuring wide peaks.
Figure 12:
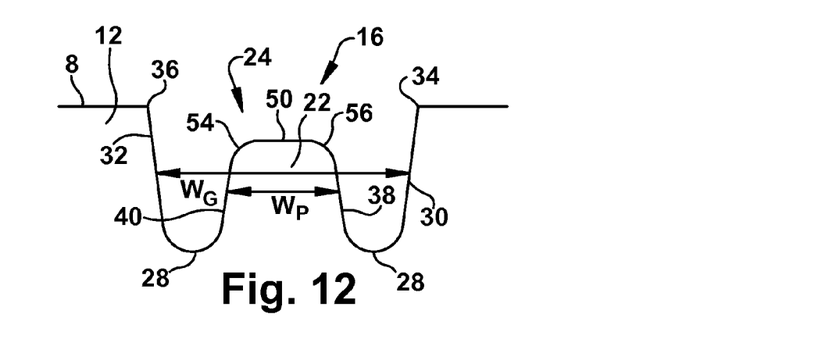
Figure 14:
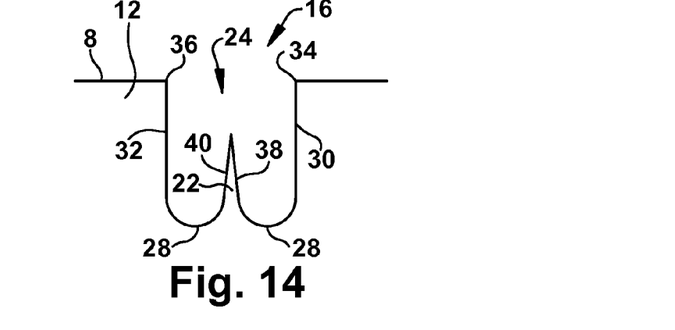
FIG. 14 illustrates alternative peak having a tapered edge at the radially outer end.

FIGS. 11 and 12 illustrate additional embodiments where lateral groove 16 has a wide peak 22. The shape of peak 22 illustrated in FIG. 11 is similar in shape to that shown in FIGS. 4 and 5 but is wider. Peak 22 in FIG. 12 has first peak wall 38 and second peak wall 40 that are generally planar and angled with respect to the radial direction. First 38 and second peak wall 40 meet a first curved transition 54 and second curved transition 56. First 54 and second curved transitions 56 blend into flat top surface 50 at radially outer end 24. Peak width $W_P$ may be defined as the width of peak 22 measured at a radial position one half the peak height P from radially outer end 24 of peak 22, while groove width $W_G$ may be similarly measured at a point one half the groove depth from groove bottom 28. Using such a convention, peak width $W_P$ of peak 22 shown in FIG. 11 is about 50 percent of groove width $W_G$. Peak 22 shown in FIG. 12 similarly has a peak width $W_P$ of about 50 percent of groove width $W_G$. In other embodiments, peaks 22 may have larger or narrower widths $W_P$ relative to groove width $W_G$. For example, peaks may have peak width $W_P$ that range from 5 percent to 75 percent relative to groove width $W_G$. Preferably, peak width $W_P$ is between about 66 percent and 33 percent of groove width $W_G$. FIG. 14 illustrates a peak 22 similar in shape that shown in FIGS. 2 and 3 and having a peak width $W_P$ of about 5 percent of groove width $W_G$.

Figure 17:
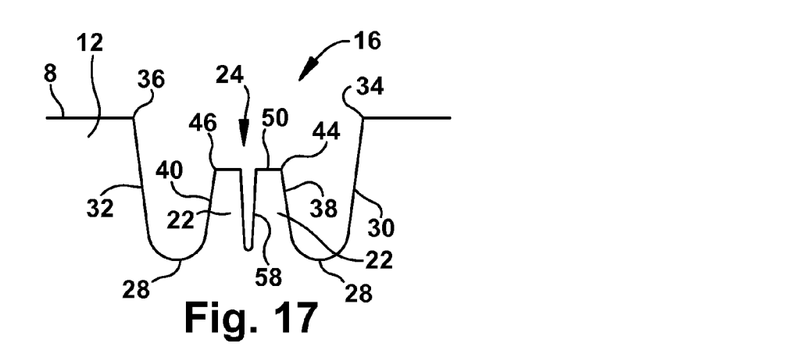
FIG. 17 illustrates an alternative peak featuring a sipe extending radially inward from the radially outer end.

FIG. 17 illustrated an alternative embodiment according to the present disclosure. A peak similar to that shown in FIG. 11 includes a sipe 58 located within flat top surface 50 of peak 22. Additional sipes 58 may be added in circumferentially adjacent locations in radially outer end 26, whether a flat top surface 50 or an alternative radially outer end 26.

Figure 18:
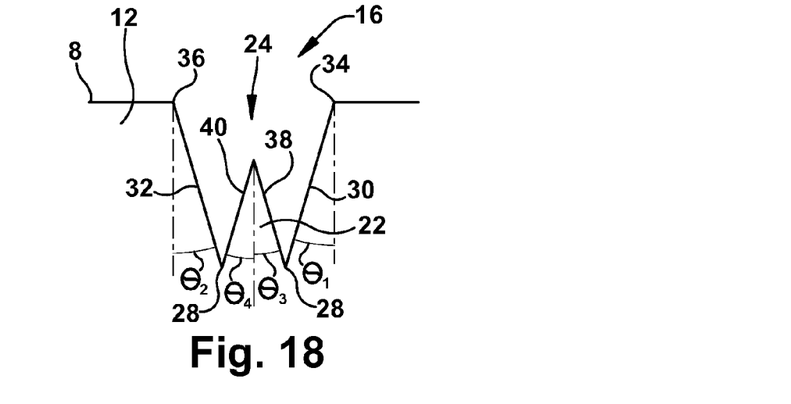
FIG. 18 illustrates a groove featuring an alternative peak having angled walls and peak having a tapered edge at the radially outer end.

FIG. 18 illustrates yet another alternative embodiment. First biting side 30 and first non-biting side 32 are substantially flat and extend at angles $\theta_1$ and $\theta_2$, respectively, relative to the radial direction from groove bottom 28 to a first biting edge 34 and first non-biting edge 36, respectively. Peak 22 has a first substantially flat wall 38 that extends from groove bottom 28 where it joins first biting side 30, to radially outer end 24 at an angle $\theta_3$ relative to the radial direction. A second substantially flat wall 40 extends from groove bottom 28 where it joins first non-biting side 32, to radially outer end 24 at an angle $\theta_4$ relative to the radial direction. Angles $\theta_1$ and $\theta_2$ need not be identical, and angles $\theta_3$ and $\theta_4$ also need not be identical.

Figure 19:
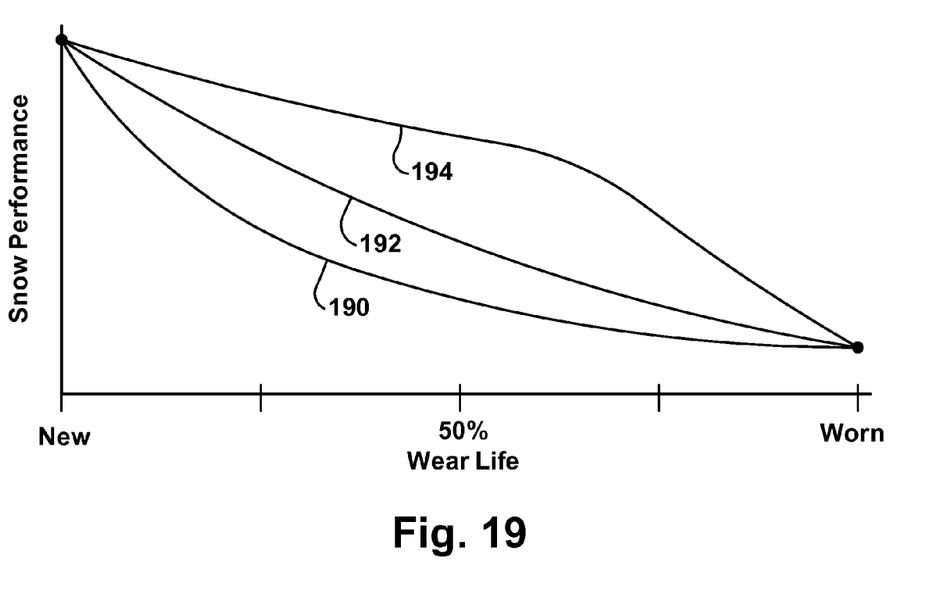
FIG. 19 illustrates a graph of a prophetic example of tire performance relative to tread wear life, including for tires according to the present disclosure.

FIG. 19 illustrates a graph of a prophetic example of tire performance relative to tread wear life, including for tires according to the present disclosure. The three curves represent three identically sized tires having identical tread geometry at the road contacting surface when new, but differ in their tread geometry as each tire wears. The curve 190 represents a tire having tapered biting and non-biting sides and no performance peaks according to the present disclosure. As the tire represented by 190 wears, the groove width diminishes more quickly than the groove width found in the tire represented by curve 192, which has biting and non-biting sides that are less tapered than those found in the tire represented by curve 190, and which also does not have performance peaks according to the present disclosure. The biting and non-biting sides of the grooves in the tire represented by curve 192 may, for example, extend radially from the groove bottom. The tire represented by curve 194 has biting and non-biting sides that extend from the groove bottom in the same manner as the tire represented by curve 192, and also has performance peaks according to the present disclosure. The horizontal axis represents remaining groove depth, ranging from 100 percent groove depth for a new tire, down to 0 percent for a completely worn tire having no remaining grooves. The vertical axis indicates snow traction, which may be measured as the coefficient of friction between a tire and a road surface in wintery or snowy conditions. Higher values indicate better performance. Other suitable metrics for the vertical axis are the maximum cornering force or the inverse of the stopping distance. Each type of tire degrades in performance as the groove depths decrease. As can be seen, performance of the tire having performance peaks according to the present disclosure is improved over both tires that do not have such performance peaks, and the improved performance is exhibited over the entire wear life of the tires.

For the purposes of this disclosure and unless otherwise specified, "a" or "an" means "one or more." To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term. From about X to Y is intended to mean from about X to about Y, where X and Y are the specified values.

While the present disclosure illustrates various embodiments, and while these embodiments have been described in some detail, it is not the intention of the applicant to restrict or in any way limit the scope of the claimed invention to such detail. Additional advantages and modifications will be apparent to those skilled in the art. Therefore, the invention, in its broader aspects, is not limited to the specific details and illustrative examples shown and described. Accordingly, departures may be made from such details without departing from the spirit or scope of the applicant's claimed invention. Moreover, the foregoing embodiments are illustrative, and no single feature or element is essential to all possible combinations that may be claimed in this or a later application.

What is claimed is:
1. A tire comprising:
   a tread extending from a first tread edge to a second tread edge and having a plurality of blocks defining a plurality of lateral grooves, each of the plurality of lateral grooves having a groove width, as measured in a substantially circumferential direction, that is less than a width of an adjacent tread block, as measured in a substantially circumferential direction;
   the lateral grooves having a groove bottom defining a radial groove depth, a first trailing side extending outwardly from the groove bottom to a first trailing edge, and a first leading side extending outwardly from the groove bottom to a first leading edge;

a first peak disposed in at least one lateral groove, the first peak comprising a first peak wall that is generally planar and angled with respect to the radial direction extending outwardly from the groove bottom and a second peak wall that is generally planar and angled with respect to the radial direction extending outwardly from the groove bottom, the first peak terminating at a radially outer end and terminating at an axial distance from an equatorial plane less than or equal to one half a tread width, and the first peak having a height between 25 percent and 75 percent of a depth of the at least one lateral groove; and a second peak disposed in the at least one lateral groove circumferentially adjacent the first peak, the second peak comprising a third peak wall that is generally planar and angled with respect to the radial direction extending outwardly from the groove bottom and a fourth peak wall that is generally planar and angled with respect to the radial direction extending outwardly from the groove bottom, the second peak terminating at an axial distance from the equatorial plane less than or equal to one half a tread width, and the second peak having a height between 25 percent and 75 percent of a depth of the at least one lateral groove.

2. The tire of claim 1 wherein the radially outer end comprises a tapered edge.

3. The tire of claim 2 wherein the first peak wall extends from the groove bottom at a first angle with respect to a radial direction and the second peak wall extends from the groove bottom at a second angle with respect to the radial direction;

the first wall extends further than the second wall, and the first and second wall are joined by a third substantially flat wall having a third angle relative to the radial direction; and the third wall joins the first wall to form a tapered edge at the radially outer end of the first peak.

4. The tire of claim 2 wherein the first peak has a height of about 50 percent of the depth of the at least one lateral groove.

5. The tire of claim 1 wherein the radially outer end of the first peak comprises:

a substantially flat surface perpendicular to a radial direction and bordered by a second trailing edge and a second leading edge.

6. The tire of claim 1, the first peak wherein the radially outer end comprises a substantially flat surface perpendicular to a radial direction bordered by a first and second curved transition, the first curved transition disposed between the radially outer end and the first wall and the second curved transition disposed between the radially outer end and the second wall.

7. The tire of claim 1 wherein the radially outer end comprises a substantially flat angled surface.

8. The tire of claim 1 wherein the radially outer end comprises a rounded edge.

9. The tire of claim 1 wherein a third peak is disposed in the at least one lateral groove circumferentially adjacent the second peak and extending outwardly from the groove bottom, terminating at a third radially outer end and terminating at an axial distance from the equatorial plane less than or equal to one half a tread width, the third peak having a height between 25 percent and 75 percent of a depth of the at least one lateral groove.

10. The tire of claim 1 wherein the first peak has a radial height greater than the second peak by about 25 percent the depth of the at least one lateral groove.

11. The tire of claim 1 wherein the first peak has a radial height greater than the second peak by about 15 percent the depth of the at least one lateral groove.

12. The tire of claim 1 wherein the radially outer end comprises at least one laterally running sipe.

13. The tire of claim 1 wherein the first trailing side is substantially flat and extends at an angle relative to a radial direction from the groove bottom to the first trailing edge, and a first leading side is substantially flat and extends at an angle relative to a radial direction from the groove bottom to the first leading edge.

14. The tire of claim 13 wherein the first peak comprises:

a first substantially flat wall extending from the first trailing edge at a first angle with respect to a radial direction and a second substantially flat wall extending from the first leading edge at a second angle with respect to the radial direction.

15. A tire comprising:

a tread extending from a first tread edge to a second tread edge and having a plurality of blocks having road contacting surfaces and defining a plurality of lateral grooves, each of the plurality of lateral grooves having a groove width, as measured in a substantially circumferential direction, that is less than a width of an adjacent block, as measured in a substantially circumferential direction;

the lateral grooves having a groove bottom defining a radial groove depth relative to the road contacting surface of blocks adjacent the lateral groove, a first trailing side extending outwardly from the groove bottom, and a first leading side extending outwardly from the groove bottom; and at least two peaks, including a first peak and a second peak circumferentially adjacent the first peak, wherein the first peak comprises a first peak wall that is generally planar and angled with respect to the radial direction extending radially outwardly from the groove bottom of at least one of the lateral grooves and a second peak wall that is generally planar and angled with respect to the radial direction extending radially outwardly from the groove bottom of the at least one of the lateral grooves, wherein the first peak terminates at a radially outer end recessed relative to the road contacting surface by at least about 25 percent of the groove depth, wherein the first peak terminates at an axial distance from an equatorial plane less than or equal to one half a tread width, wherein the second peak comprises a third peak wall that is generally planar and angled with respect to the radial direction extending radially outwardly from the groove bottom of the at least one of the lateral grooves and a fourth peak wall that is generally planar and angled with respect to the radial direction extending radially outwardly from the groove bottom of the at least one of the lateral grooves, wherein the first peak terminates at a radially outer end recessed relative to the road contacting surface by at least about 25 percent of the groove depth, and wherein the second peak terminates at an axial distance from an equatorial plane less than or equal to one half a tread width.

16. The tire of claim 15 wherein the first peak terminates at a radially outer end recessed relative to the road contacting surface by at least about 50 percent of the groove depth.

17. The tire of claim 16 wherein the first peak has a circumferential width between about 66 percent and 33 percent of a circumferential width of the at least one of the lateral grooves.

18. A tire comprising:
a tread extending from a first tread edge to a second tread edge and having a plurality of blocks defining a plurality of lateral grooves, each of the plurality of lateral grooves having a groove width, as measured in a substantially circumferential direction, that is less than a width of an adjacent block, as measured in a substantially circumferential direction;
the lateral grooves having a groove bottom depth and defining a radial groove depth, a first trailing side extending outwardly from the groove bottom to a first trailing edge, and a first leading side extending outwardly from the groove bottom to a first leading edge;
a first peak disposed in the at least one lateral groove, the first peak being defined by at least a first and second peak wall that is generally planar and angled with respect to the radial direction extending outwardly from the groove bottom, the first peak terminating at a first radially outer end and terminating at an axial distance from an equatorial plane less than or equal to one half a tread width, the first peak having a height between 25 percent and 75 percent of a depth of the at least one lateral groove; and
a second peak disposed in the at least one lateral groove circumferentially adjacent the first peak, the second peak being defined by at least a third and fourth peak wall that is generally planar and angled with respect to the radial direction extending outwardly from the groove bottom, the second peak terminating at a second radially outer end and terminating at an axial distance from the equatorial plane less than or equal to one half a tread width, the second peak having a height between 25 percent and 75 percent of a depth of the at least one lateral groove.

19. The tire of claim 18 wherein a third peak is disposed in the at least one lateral groove circumferentially adjacent the second peak and extending outwardly from the groove bottom.

20. The tire of claim 18 wherein the first peak has a circumferential width between about 66 percent and 33 percent of a circumferential width of the at least one of the lateral grooves.

* * * * *